(12) United States Patent
Zinkevich

(10) Patent No.: US 8,138,881 B2
(45) Date of Patent: Mar. 20, 2012

(54) COATED WIRE AND FILM RESISTOR

(75) Inventor: Matsvei Zinkevich, Goldbach (DE)

(73) Assignee: Heraeus Sensor Technology GmbH, Hanau (DE)

( * ) Notice: Subject to any disclaimer, the term of this patent is extended or adjusted under 35 U.S.C. 154(b) by 643 days.

(21) Appl. No.: 12/236,879

(22) Filed: Sep. 24, 2008

(65) Prior Publication Data

US 2009/0091418 A1 Apr. 9, 2009

(30) Foreign Application Priority Data

Sep. 28, 2007 (DE) .......................... 10 2007 046 907

(51) Int. Cl.
*H01C 1/012* (2006.01)
(52) U.S. Cl. ..................... 338/308; 338/25; 338/22 R
(58) Field of Classification Search .................. 338/308, 338/25, 22 R
See application file for complete search history.

(56) References Cited

U.S. PATENT DOCUMENTS

| | | | | |
|---|---|---|---|---|
| 4,683,481 A | * | 7/1987 | Johnson | 347/65 |
| 4,793,182 A | * | 12/1988 | Djorup | 73/335.02 |
| 5,280,264 A | * | 1/1994 | Yajima et al. | 338/25 |
| 5,349,322 A | * | 9/1994 | Yajima et al. | 338/25 |
| 5,561,411 A | * | 10/1996 | Kuzuoka | 338/22 SD |
| 5,610,572 A | * | 3/1997 | Yajima | 338/22 R |
| 5,831,512 A | * | 11/1998 | Wienand et al. | 338/25 |

FOREIGN PATENT DOCUMENTS

| | | |
|---|---|---|
| AT | 172532 B | 9/1952 |
| DE | 1479291 U | 11/1939 |
| DE | 1007400 B | 10/1957 |
| DE | 1883894 U | 12/1963 |
| DE | 2217769 A | 10/1973 |
| DE | 2354045 A1 | 5/1975 |
| DE | 2554464 C3 | 7/1980 |
| DE | 3115656 A1 | 11/1982 |
| DE | 4000301 C1 | 5/1991 |

(Continued)

OTHER PUBLICATIONS

German translation of Japanese Examination Report Issued Oct. 15, 2010 in Japanese Application No. 2008-250289.

(Continued)

*Primary Examiner* — Kyung Lee
(74) *Attorney, Agent, or Firm* — Panitch Schwarze Belisario & Nadel LLP

(57) ABSTRACT

A coated wire is solderable with soft solder while maintaining separate phases of the core and the coating. A 100 μm to 400 μm thick nickel wire may be coated galvanically with silver. For a film resistor with coated wires as connection wires, including a platinum measurement resistor on an electrically insulating substrate and connection wires connected to the measurement resistor, the connection wires have a coated nickel core. The coating may be made of silver or glass or ceramic or a mixture of these materials, or on its outside may be made of glass or ceramic or a mixture of these materials. For producing film resistors a thin metal or glass component is deposited on a connection wire connected to a track conductor arranged on an electrically insulating substrate, and a thick glass paste is deposited and fired on this metal or glass component. For mass production of film, several film resistors encased together in glass may be partitioned by fracturing.

7 Claims, 5 Drawing Sheets

FOREIGN PATENT DOCUMENTS

| | | |
|---|---|---|
| DE | 4125980 A1 | 2/1993 |
| DE | 4126220 A1 | 2/1993 |
| DE | 19540194 C1 | 2/1997 |
| DE | 10153217 A1 | 6/2003 |
| EP | 0772031 A1 | 5/1997 |
| EP | 0964230 A2 | 12/1999 |
| EP | 1308967 A2 | 5/2003 |
| JP | 63274796 A | 11/1988 |
| JP | 02087030 A | 3/1990 |
| JP | 0444101 U | 4/1992 |
| JP | 05-052668 A | 3/1993 |
| JP | 06251907 A | 9/1994 |
| JP | 10275707 A | 10/1998 |
| JP | 2002289402 A | 10/2002 |

OTHER PUBLICATIONS

"Heraeus-Keramik-und Glas-Messwiderstande" (PTM-W2), W.C. Heraeus GmbH, Hanau, Germany—brochure (Mar. 1988).

* cited by examiner

COATED WIRE AND FILM RESISTOR

BACKGROUND OF THE INVENTION

The present invention relates to film resistors, a method for their production, and also novel connection wires made of nickel for film resistors. Film resistors in the sense of the present invention comprise a resistive pattern on an electrically insulating surface of a substrate, wherein the resistive pattern is covered with a glass cover and is electrically connected with connection wires, wherein the connection wires project out from the glass cover.

In particular, the connection wires are mechanically fixed to the glass cover. The glass cover is formed by the deposition of glass paste and its firing on the substrate. Construction in single units is expensive for mass production. If several film resistors are encased with glass together on a common substrate, the film resistors can then by partitioned by sawing.

According to the Heraeus brochure "Ceramic and glass measurement resistors/film resistors/test resistor thermometers" (PTM-W2), film resistors with platinum-coated connection legs made of nickel are known. Such film resistors are designed for high-temperature applications between 400° C. and 1000° C.

BRIEF SUMMARY OF THE INVENTION

The problem of the present invention comprises providing a more simplified method for mass production. In particular, while maintaining the protective properties achieved with a platinum coating, the soldering of the connection wires should be simplified.

According to the invention, it was recognized that wires made of silver or silver alloy would negatively affect the measurement resistor, but not wires made of a nickel core with a thin silver coating. The silver coating, in turn, allows the use of soft solder for mounting the film resistor on its end facing away from the measurement resistor. In a preferred embodiment according to the invention, a nickel wire coated with silver is connected to the measurement resistor by thermal compression via a connection field (pad). On this pad, a glass coating is applied, and for the case using thin-film technology, a glass paste is also deposited. The glass paste is sintered to form a porous body. Finally, the measurement resistors are partitioned by breaking apart the glass paste, in particular at desired breaking points.

Preferably, the wire is heated so that a glass film forms around the heated wire. A coating of the wire, in particular a thin-film coating, is also suitable, in order to increase the strength of the connection of the wire to the measurement resistor and the glazing.

For the coating, particularly effective, suitable materials include non-volatile inorganic components, such as ceramic or metal, in particular glass.

According to the invention, connection wires are provided having a nickel core and a silver coating. The connection wire having a silver coating according to the invention can be soldered directly to the coating, wherein the contact point suffers no loss in quality of the connection wire due to alloy formation between the silver and nickel. Thus, the production of film resistors of high quality is significantly simplified.

For a coated wire having a core based on nickel, according to the invention the core and coating of the wire remain as separate phases during soldering with soft solder, especially if the coated wire has a coating based on silver.

The silver coating can be diluted with an inert material such as glass, in particular quartz glass or ceramic, especially aluminum oxide. Preferably, the silver coating or its silver phase has a purity of at least 99 wt. %. Likewise, the core can be diluted with an inert material. Preferably, the nickel core or its nickel phase has a purity of at least 99 wt. %.

The silver can also be completely replaced by an inert material. Consequently, for a coating made of silver or glass or ceramic or a mixture of these materials, according to the invention the core material remains a separate phase during the soldering with soft solder. Because silver may in no way contaminate the measurement resistor, the silver coating is constructed significantly thinner than the nickel core, in particular by at least one order of magnitude, preferably by at least two orders of magnitude.

A diameter of 100 µm to 400 µm for the nickel core and a 0.2 µm to 5 µm thick silver coating are dimensions according to one embodiment of the invention. For its production a 100 µm to 400 µm thick nickel wire can be coated galvanically with silver. In particular, in one embodiment silver is deposited galvanically onto the nickel wire with a coating thickness of 0.5 to 1 µm.

For the production of a film resistor according to the invention with a coated wire, when connecting the coated wire to the pad of the film resistor blank, the coating and the core remain as separate phases.

A film resistor having a platinum measurement resistor on an electrically insulating substrate and coated wires connected to the measurement resistor as connections wires, which have a coated nickel core, is constructed according to the invention with the coating made of silver or glass or ceramic or a mixture of these materials or on its outside made of glass or ceramic or a mixture of these materials. In particular, despite the thermal compression with the measurement resistor, the coating of the connection wire remains as a separate phase relative to the core of the connection wire in the region of the contact. For this purpose, the silver coating or the silver phase or the nickel core preferably has a purity of at least 99 wt. %. The film resistor thereby has a coated connection wire, whose coating is not endangered, with respect to its electrical conductivity and in terms of its mechanical properties, by diffusion of the core material.

In a high-value embodiment, the measurement resistor and the connection wires, in the region of their ends attached to the measurement resistor, are covered with glass or glass ceramic.

A film resistor, comprising an electrically insulating surface of a substrate, a track conductor arranged on the electrically insulating surface, two nickel wires connected to the track conductor, and a glass cover sealing the track conductor and the wire ends connected to the track conductor, according to the invention has a thin glass or metal coating, in particular made of platinum or silver, on the wire and a thick glass component deposited on this coating.

In particular, its glazing has a first, thin component arranged directly on the metal surface of the wire and a thick main component deposited on this first component.

The nickel oxide film thickness on the nickel wire preferably equals less than 1 µm, in particular less than 100 nm.

In an especially stable embodiment, a thin metal or glass component is deposited on the connection wire, which is connected to a track conductor arranged on an electrically insulating substrate, and a thick glass paste is deposited and fired on this metal or glass component.

It is also possible to heat the connection wire in a medium containing glass until a glass film has formed around this wire.

According to one embodiment of the invention, it is possible to partition by fracturing several film resistors glazed together. This simplifies the production of film resistors made of at least one resistor pattern on an electrically insulating surface of a substrate having a covered resistor pattern and having connection wires strain relieved with glass, which connection wires are connected to the resistor pattern in an electrically conductive way.

In a preferred embodiment, the silver wire attached to the contact point is surrounded with glass, in particular using thin-film technology. Then, according to the invention only the wire surrounded with glass is strain relieved by deposition and firing of a glass paste. With this technique, the known bubble formation in the use of glass for strain relief of the connection wires is avoided.

In an especially simple embodiment, nickel wires according to the invention are provided with a glass coating. The glass coating protects the wires from corrosion and allows bubble-free fixing for strain relief with a glass paste. With the thin glass film, oxide films of the solder point are more easily scratched or broken. The later solder point is in itself comparable to a cermet mixture and, in the region of the solder point, is less sensitive to stresses occurring due to the different coefficients of expansion than the classic metallic solder connections strain relieved with an outer glass bead.

The outstanding stability of the film resistors according to the invention permits their partitioning by breaking apart from each other. Thus, according to an embodiment of the invention, a plurality of film resistors can be produced simultaneously on one substrate plate, in particular with a common deposition of the strain-relieved glass paste. For breaking apart, desired fracture points should be introduced, in particular by scoring the substrate. The final breaking apart for partitioning the film resistors is an enormous process simplification relative to the previous partitioning by sawing.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
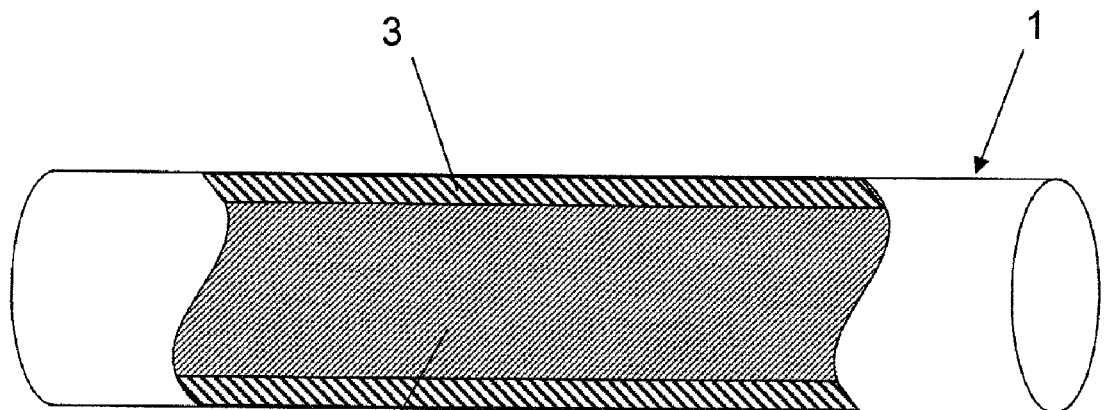
FIG. 1 includes longitudinal and transverse sectional views of nickel-silver coated wire according to an embodiment of the invention.
Figure 1:
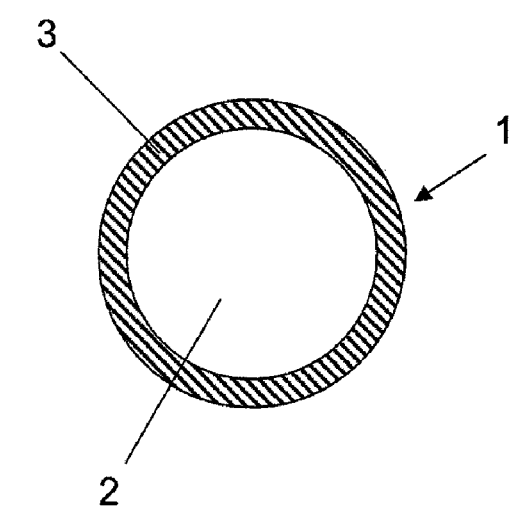

The quality of a coated wire 1 according to FIG. 1 having a nickel core 2 and a silver coating 3 is not lessened by formation of intermetallic phases, either during the production process of the wire or the film resistor or during the use of the film resistor, because silver and nickel do not tend to form intermetallic phases with each other. The formation of intermetallic phases is a frequently observed problem at solder points and is avoided according to the invention. Problems include, in particular, on the one hand, the increasing material fatigue due to phase growth and, on the other hand, the decreasing conductivity. With the wire according to embodiments of the invention, these problems do not occur. The problems also do not occur when the coating 3 has additionally glass or ceramic or is made only of glass or ceramic or a mixture of these materials. Here, the coated wires 1 according to the invention differ from conventional platinum-nickel wires, in which the nickel diffuses into the platinum and negatively affects the good properties of the platinum. According to the invention, the function of the coating remains, both upon soldering of the coated wire and also with its use as a film resistor.

This makes possible the embodiments according to the invention for the coated wire 1 with a silver coating 3 or a glass coating 3 or a ceramic coating 3 and also combinations of these as, for example, a coating 3 made of silver-cermet or a glass doped with silver. Further preferred are coatings 3 made of a composite of silver, glass, or ceramic and coatings 3 made of glass ceramic or silver coated nickel wires sheathed with glass, glass ceramic, or ceramic.

Coated wires 1 according to FIG. 1, which are additionally coated with glass or ceramic, in particular coated with an additional thin film 6 (see FIG. 3), permit a bubble-free strain relief 7 (see FIG. 4) with glass after the thermal compression. In particular, the deposition of an $SiO_2$ or $Al_2O_3$ thin film 6 offers excellent protection from any reactions of the molten glass during the firing of the strain-relief bead.

Figure 2:
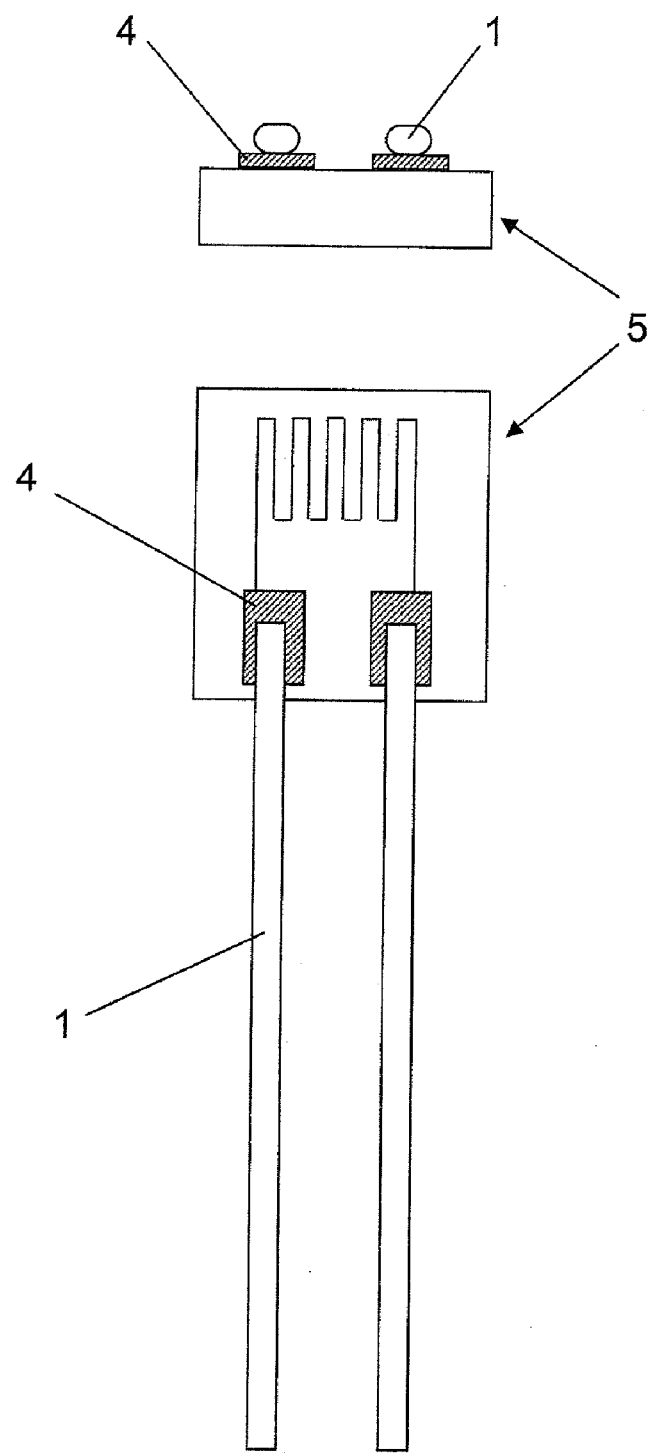
FIG. 2 includes an end sectional view and a plan view of a film resistor blank with nickel-silver coated wire according to an embodiment of the invention.

In FIG. 2, the coated wire 1 according to FIG. 1 is soldered on a pad 4 to a measurement resistor of a film resistor blank 5.

Figure 3:
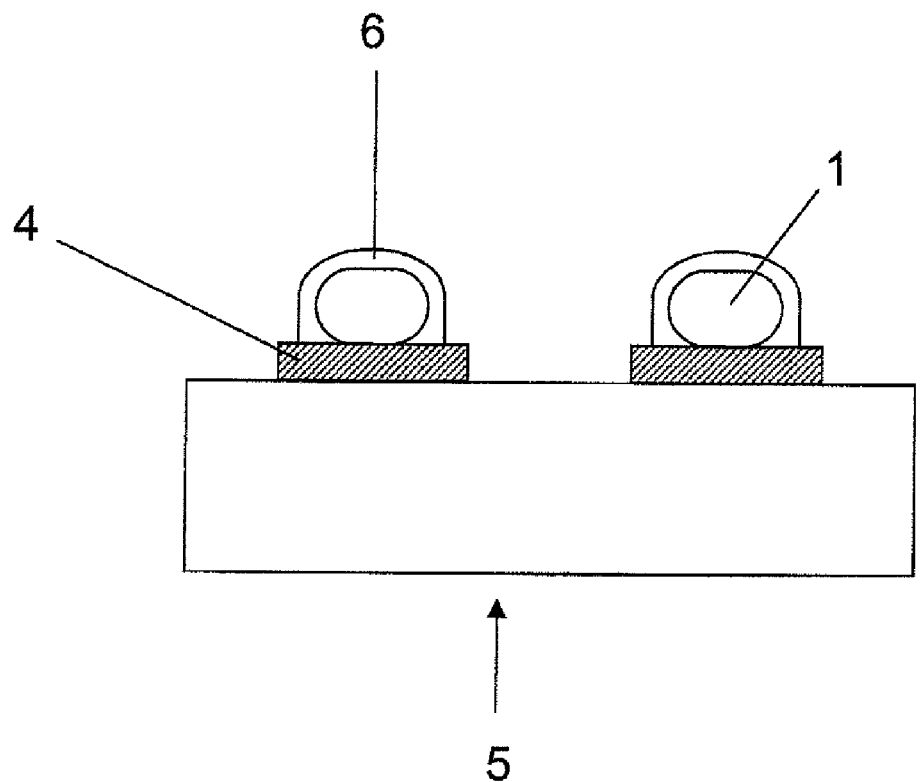
FIG. 3 is an end view of a film resistor blank having silver coated nickel wires with a thin-film coating made of a quartz glass or $Al_2O_3$ according to an embodiment of the invention.
Figure 4:
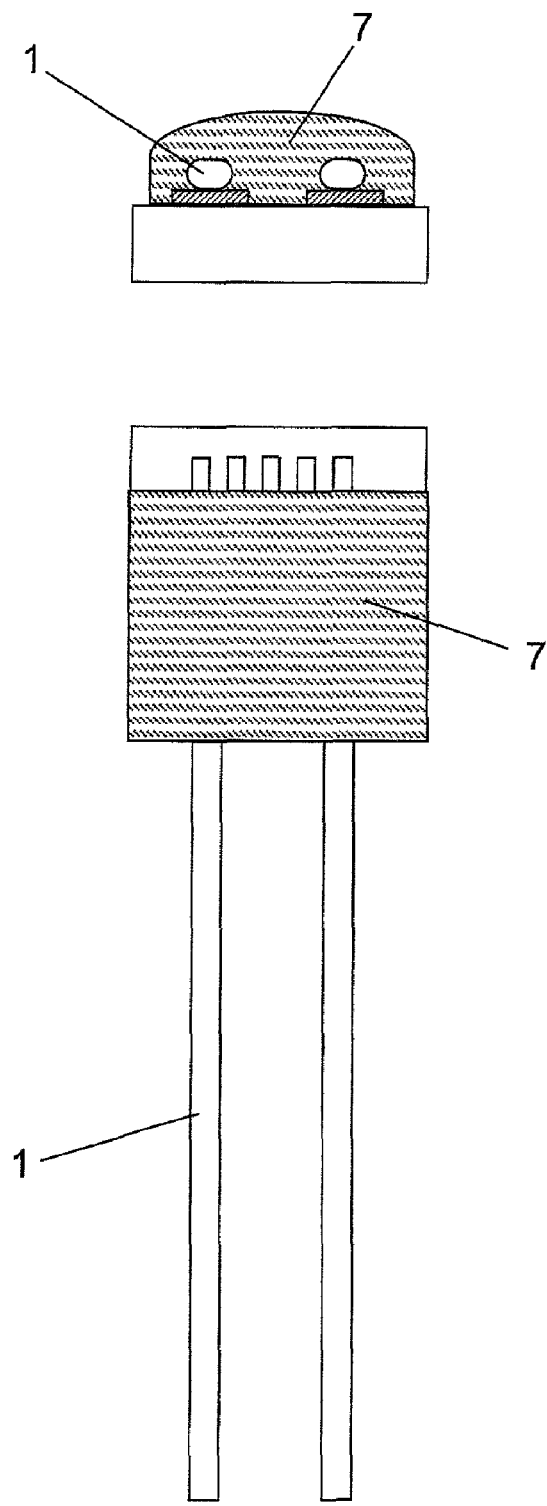
FIG. 4 includes an end sectional view and a plan view of a film resistor produced with a bubble-free stress-relief bead according to an embodiment of the invention.

In a high-value embodiment according to FIG. 2, a silver coated nickel wire 1 mounted on the pad 4 is coated with glass or ceramic 6 to form a blank 5 according to FIG. 3.

In a simple embodiment according to FIG. 2, a nickel wire 1 soldered on the pad 4 is coated with glass or ceramic 6 using thin-film technology to form a blank 5 according to FIG. 3.

Advantageously, a substrate plate with a plurality of film resistor blanks 5 is coated with glass or ceramic. On this glass or ceramic, a glass paste is deposited for strain relief 7 to form a film resistor blank according to FIG. 4, wherein the formation of bubbles on the connection wires is prevented according to the method of the invention.

Figure 5:
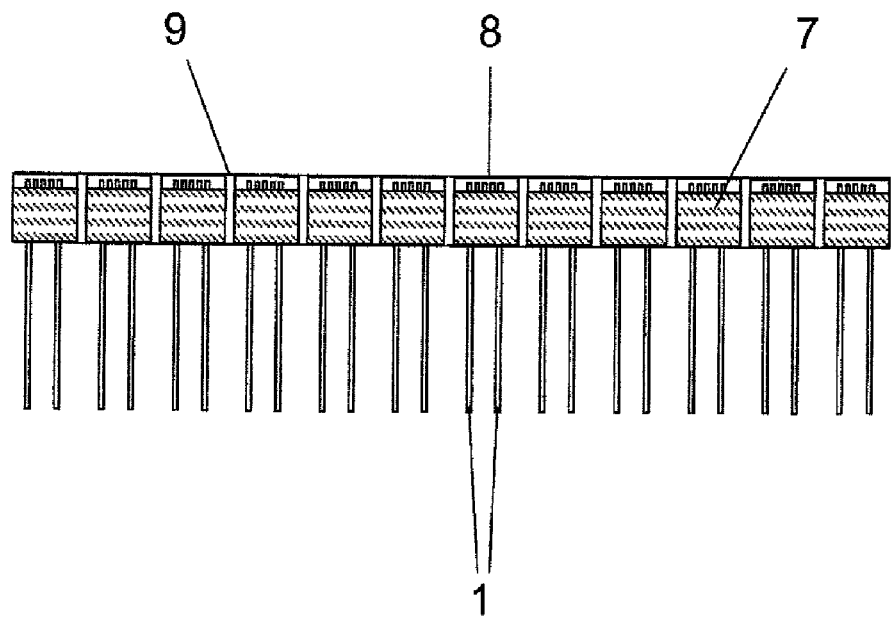
FIG. 5 is a plan view of a plurality of film resistors produced together on one plate before their partitioning and the desired fracture points helpful for the breaking apart for this partitioning according to an embodiment of the invention.

The production of film resistors 8 is performed on plates, which are used as a substrate for a plurality of film resistors 8 according to FIG. 5. Therefore, the individual processing steps for the production of film resistors 8 can be performed in parallel for a plurality of film resistors 8. In particular, a common thin-film deposition can be performed for coating the soldered connection wires with glass or ceramic. Preferably, desired fracture points 9 according to FIG. 5 are created, so that the film resistors 8 are more easily breakable for partitioning.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A film resistor comprising a platinum measurement resistor on an electrically insulating substrate and connection wires connected to the measurement resistor, wherein the connection wires consist essentially of a coated core, and wherein the core comprises nickel and the coating consists essentially of silver or a mixture of silver with glass or ceramic.

2. The film resistor according to claim 1, wherein the silver coating or a silver phase of the coating or the nickel core has a purity of at least 99 wt.%.

3. The film resistor according to claim 1, wherein the nickel core has a diameter of 100 μm to 400 μm, and the silver coating is 0.2 to 5 μm thick.

4. The film resistor according to claim 1, wherein the coating of the connection wires is not endangered, with respect to its electrical conductivity and in terms of its mechanical properties, by diffusion of a material of the core.

5. The film resistor according to claim 1, wherein the measurement resistor and the connection wires are covered with glass or glass ceramic in a region of their ends attached to the measurement resistor.

6. The film resistor according to claim 1, comprising an electrically insulating surface of the substrate, a track conductor arranged thereon, two connection wires connected to the track conductor, and a glass cover sealing the track conductor and ends of the connection wires connected to the track conductor.

7. A method for producing a film resistor having a measurement resistor and a coated wire connected thereon according to claim 1, the method comprising bonding the coated wire to contact surfaces of the measurement resistor in an electrically conducting manner by thermocompression.

* * * * *